United States Patent
Stoneberg

(10) Patent No.: US 6,583,370 B2
(45) Date of Patent: Jun. 24, 2003

(54) PLASTIC ENCASED WEIGHTS

(75) Inventor: J. Bruce Stoneberg, Oak Brook, IL (US)

(73) Assignee: Safe-T Products, Inc., Franklin Park, IL (US)

( * ) Notice: Subject to any disclaimer, the term of this patent is extended or adjusted under 35 U.S.C. 154(b) by 90 days.

(21) Appl. No.: 09/853,414

(22) Filed: May 11, 2001

(65) Prior Publication Data

US 2002/0166706 A1 Nov. 14, 2002

(51) Int. Cl.⁷ .............................. G01G 1/00; A63B 21/06
(52) U.S. Cl. ........................................ 177/264; 482/106
(58) Field of Search ............................ 177/264; 482/106

(56) References Cited

U.S. PATENT DOCUMENTS

| | | | | | |
|---|---|---|---|---|---|
| 209,434 A | * | 10/1878 | Tuttle | ......................... | 177/264 |
| 447,136 A | * | 2/1891 | Mott | ......................... | 177/264 |
| 3,001,598 A | * | 9/1961 | Henzler | ....................... | 177/264 |
| 3,825,253 A | * | 7/1974 | Speyer | ....................... | 482/106 |
| 3,913,908 A | * | 10/1975 | Speyer | ....................... | 482/106 |
| 4,076,236 A | * | 2/1978 | Ionel | ........................... | 482/106 |
| 4,566,690 A | * | 1/1986 | Schook | ....................... | 482/106 |
| 4,913,422 A | * | 4/1990 | Elmore et al. | .............. | 482/106 |
| 5,131,898 A | * | 7/1992 | Panagos | ..................... | 482/106 |
| 5,171,199 A | * | 12/1992 | Panagos | ..................... | 482/106 |
| 5,266,069 A | * | 11/1993 | Thorne | ........................ | 482/106 |
| 5,464,379 A | * | 11/1995 | Zarecky | ....................... | 482/106 |
| 5,823,922 A | * | 10/1998 | Eckmann | ..................... | 482/108 |
| 6,132,344 A | * | 10/2000 | Vanderbleek | ............... | 482/108 |
| 6,461,282 B1 | * | 10/2002 | Fenelon | ..................... | 482/106 |

* cited by examiner

*Primary Examiner*—Randy Gibson
(74) *Attorney, Agent, or Firm*—Michael Best & Friedrich, LLC

(57) ABSTRACT

A plastic encased hexagonal shaped metal weight made from steel rod is provided with engagement regions at its ends capable of engaging the ends of other such weights, so as to enable nested, engaged stacking of two or more of such weights. The weights can be color coded as to their weight.

16 Claims, 3 Drawing Sheets

PLASTIC ENCASED WEIGHTS

BACKGROUND OF THE INVENTION

The invention generally relates to weights for weighing equipment employed in laboratories or for use in classrooms for teaching mass measurement as part of weighing exercises mathematics or science curricula. More particularly, this invention relates to inexpensive, optionally color coded weights made from plastic-encased high mass round rod that resist undesired rolling about or ingestion by children and can be stacked in engaged, end-to-end relation.

Conventional, hexagonal, all-metal weights are cut from hexagon-shaped metal rod and stamped with appropriate weight markings. Such weights typically lack any matching recessed or protruding end portions for engaged or nested stacking in end-to-end relation with other such weights. Hence, if it is desired to arrange conventional weights in stacks for storage or to combine masses for use in weighing exercises, such conventional, flat all-metal weights tend to slide off one another.

In addition, the hexagon-shaped steel rod material from which such conventional weights are cut tends to cost considerably more than comparable round steel rod material. Also, because the hexagon-shaped steel rod used in the conventional weights is exposed to the environment, the exterior of the weights is ordinarily plated, which further increases manufacturing costs. Furthermore, even plated weights are vulnerable to corrosion when scratched or subjected to extended exposure in corrosive laboratory conditions.

Producing such conventional all-metal hexagon weights involves multiple expensive manufacturing steps. These steps include sawing, deburring, plating, and stamping of the mass designation on the face of the finished weight. Stamping of the mass designation typically requires an additional punch press operation or a manual hammer and punch operation.

Conventional all metal hexagon-shaped weights are typically only 1.125" or less across their widest points. Objects of this size are deemed a safety hazard for children, since they fit within the 1.25" diameter testing tube used as the standard for determining whether an object presents an unsafe choking risk for children.

In addition, such conventional unplated, all-metal hexagon-shaped metal weights can have pointed or sharp edges which can injure the user or damage expensive weighing equipment with which they are used.

Thus, it is an object of the present invention to provide safer weights that are encased by an outer cushioning shell of material such as plastic, and that are free of pointed or sharp edges.

It is another object of the present invention to use round steel rod as the internal weight component in weights having an external hexagonal configuration that resists undesirable rolling about.

Another object of the invention is to provide weights that can be stacked in engaged, end-to-end fashion.

It is another object of the invention to encase rod in a protective cushioning outer shell that seals the internal steel rod from moisture or corrosive agents, without the need for plating the steel component.

It is another object of the invention to provide weights having an out shell in which the mass designation is provided when the shell is formed.

It is a still further object of the invention to provide rod-encased weights in which the outer shell of encasing material increases the diameter of the weights to minimize choking hazards.

It is yet another object of the invention to provide an outer shell that encases the internal metal rod to cushion the weight, if dropped.

Yet another object of the invention is to provide a weight with an outer shell having rounded edges that are not only safer to use than prior weights but are also more aesthetically pleasing.

It is yet another object of the invention to provide weights that are color-coded to designate their mass.

It is still another object of the invention to provide weights that are easier and more cost-effective to manufacture.

These and other such objects of the invention will become apparent in the present specification, claims and drawings.

SUMMARY OF THE INVENTION

The weights of the present invention each comprise an internal generally rod-shaped member having a length and first and second opposite ends, with an outer shell substantially encasing at least a portion of the exterior of the rod-shaped member along the length of the rod-shaped member. The rod-shaped member will be made of high mass material such as steel rod. The shell preferably will be made of plastic or of an elastomeric material and will completely encase the ends and length of the rod-shaped member, so as to seal it off from environmental conditions.

The shell may comprise at least one end portion proximate at least one of the opposite ends of the rod-shaped member covering at least a portion of the end of the rod-shaped member. The shell can be configured, for example, with a hexagonal cross-section, to impede rolling. One shell opposite end portion can be configured for engaging the opposite end portion of another of the weights for stacking of two or more of the weights in an end-to-end arrangement. The shell preferably will be configured so that all of its edges are substantially rounded.

The shell may also be molded to provide a mass designation formed thereon to indicate the mass of the weight. The shell can also be color-coded either concurrently or alternatively to the molded mass designation to indicate the mass of the weight. At its narrowest point (the transverse cross sectional width), the weight preferably will be greater than 1.25" across.

The invention further comprises the method of making inexpensive, optimally color coded weights made from plastic-encased high mass round rod that resist undesired rolling about or ingestion by children and can be stacked in engaged, end-to-end relation by: cutting a high mass rod material having opposite ends and a length to a desired length corresponding to the mass desired in the final encased weight; molding a shell material having a body, an interior region and at least one end portion to substantially cover at least a portion of the length and at least one end of the rod; inserting the rod material into the interior region of the shell; forming a first engagement region in the end portion of the shell material; and, configuring the first engagement region of the shell for engaging a second engagement region on another weight to facilitate stacking of two weights in an end-to-end arrangement.

BRIEF DESCRIPTION OF THE DRAWINGS

For a more complete understanding of the present invention, reference is now made to the following description of the invention taken with the accompanying drawings, in which.

DETAILED DESCRIPTION OF THE DRAWINGS

Figure 1:
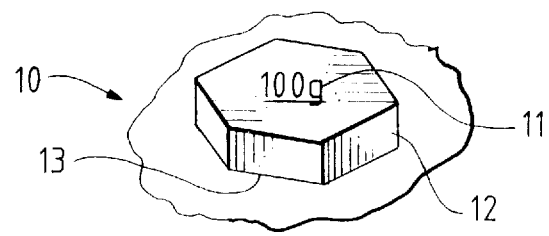
FIG. 1 is a perspective view of a prior art all-metal, hexagonal weight.

While this invention is susceptible of embodiment in many forms, there is shown in the drawings, and will be described in detail herein, a preferred embodiment, with the understanding that the present disclosure is to be considered an example of the principles of the invention and is not intended to limit the invention to the embodiment illustrated.

FIG. 1 shows a prior art hexagonal weight 10 formed from a steel rod having a substantially hexagonal transverse cross-section. The mass of the weight (100 g) is stamped on ends or faces 11 or 13 in a separate stamping operation after the weight is made. Faces 11 and 13 are substantially flat and lack any means for engaging or interlocking with another weight when placed in vertically stacked end-to-end relation.

Figure 2:
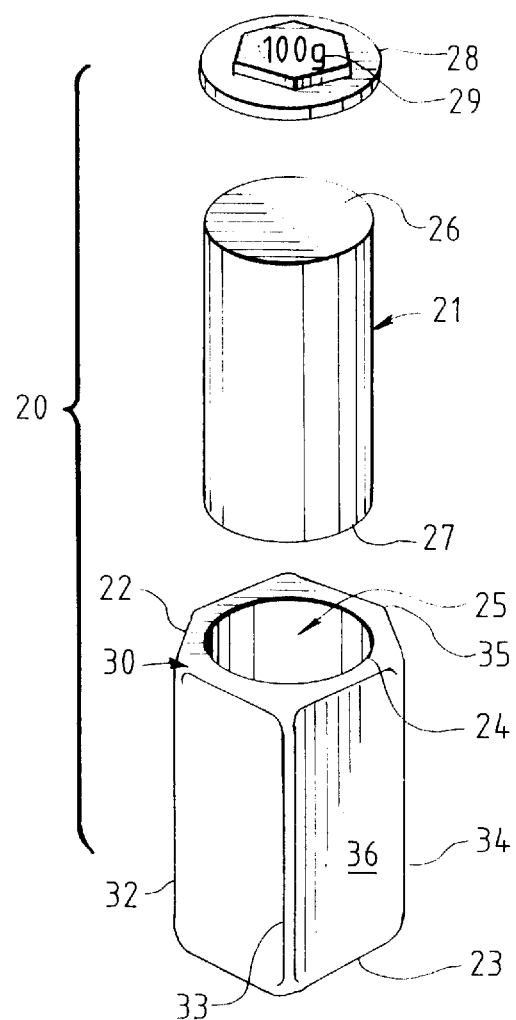
FIG. 2 is an exploded perspective view of a weight in accordance with the present invention and its component parts.

FIGS. 2–6 illustrate an encased weight 20 according to a preferred embodiment of the present invention. While only hexagon-shaped outer configurations are illustrated and described herein, pentagonal, circular, square or other outer configurations should be considered as being within the scope of the invention. The weight 20, as shown in FIG. 2, comprises a shell 22 having a body 30, end portions 23 and 24, and an interior cavity 25 along the longitudinal axis of the shell.

Weight 20 further comprises rod member 21 which, in the preferred embodiment, is cut from steel rod material having a substantially circular transverse cross-section. Rod member 21 has first and second opposite ends 26 and 27, respectively, and a length running along its longitudinal axis. End portions 23 and 24 of the shell are positioned over ends 26 and 27 of rod 21. At least one end portion 24 of shell 22 may include a cap 28. When assembled, rod member 21 fits securely within interior cavity 25 of body 30 of the shell. Cap 28, which is round in the illustrated preferred embodiment, then fits into the end of cavity 25 so the shell encases the rod and extends along its length. Cap 28 can be provided at one or both ends of shell 22.

In the preferred embodiment shell 22 is a molded plastic material formed into a substantially hexagonal rod-like shape. Edges 32–35 and the edges of end portions 23 and 24 are rounded. Shell 22 completely encases the ends 26 and 27 and the length of rod member 21, so as to seal it off from environmental conditions, corrosive agents, moisture and the like which can be encountered in the lab or classroom where such weights are likely to be used.

Figure 3:
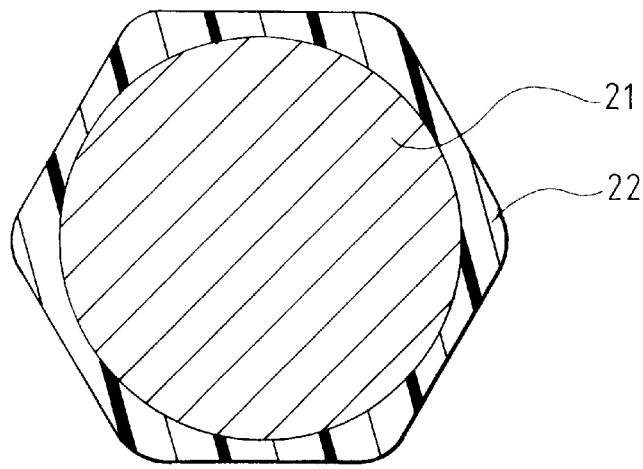
FIG. 3 is a cross-sectional view of a weight in accordance with the present invention taken along the line 3—3 of FIG. 3 showing the interior of the weight.

As shown in FIG. 3, hexagonal-shaped shell 22 tightly surrounds circular rod 21 and serves to give the weight a hexagonal outer shape. This enables the use of round rod material, which is more economical than hexagonal rod or bar stock.

Figure 4:
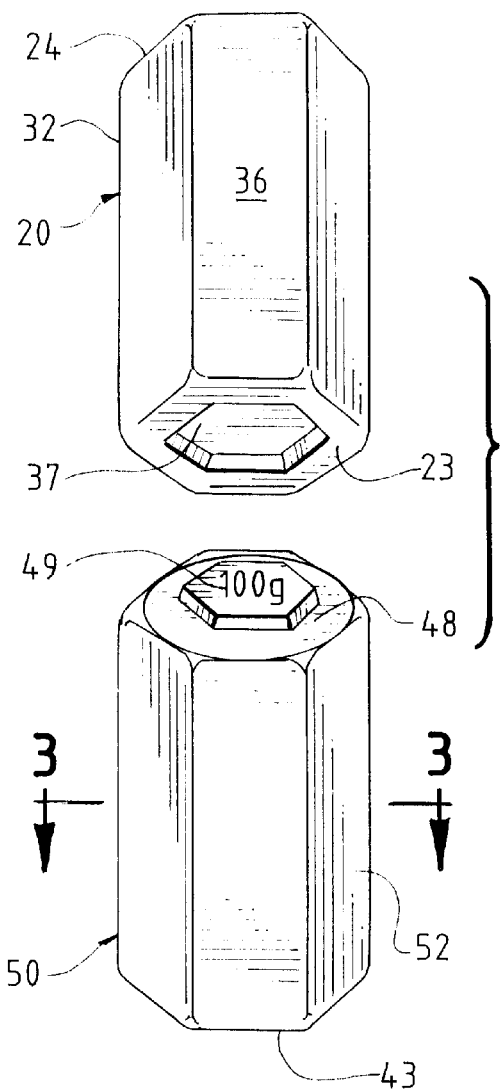
FIG. 4 is a perspective view of the engagement regions of two weights in accordance with the present invention.

At least one side 36 of body 30 of shell 22 is substantially flat so as to impede undesired rolling of weight 20. As shown in FIG. 2, end portion 24 is provided with an elevated or male engagement region 29. As shown in FIG. 4, opposite end portion 23 of shell 22 is provided with a recessed or female engagement region 37. Engagement regions 37 and 29 have substantially flat tops and sides and are capable of engaging the counterpart engagement region on the end or face of another weight in order to enable stacking of two or more weights.

In the preferred embodiment, each weight is provided with a male engagement region such as 29 at one end and a female engagement region such as 37 at the other end. The areas 23 and 48 surrounding engagement regions 49 and 37, as shown in FIG. 4 are substantially flat, so as to enable the best possible seating of weight 20 on weight 50, as shown in FIG. 6.

Figure 5:
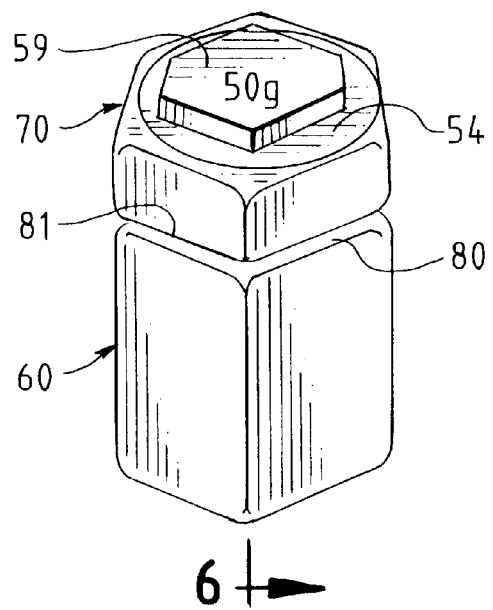
FIG. 5 is a perspective view of two weights in accordance with the present invention in end-to-end stacked relation.
Figure 6:
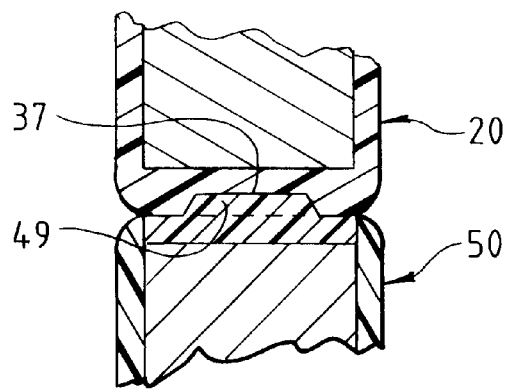
FIG. 6 is a partial cross-sectional view of two weights in engaged, stacked relation.

Engagement regions 37 and 49 of FIG. 4 are correspondingly shaped so as to enable mated, nested receipt of such complimentary engagement regions when two or more of such weights are placed in vertically stacked end-to-end arrangement, as shown in FIGS. 5 and 6. While engagement regions 49 and 37 are shown as hexagonal in shape, other corresponding male and female shapes capable of being mated together should be considered as being within the scope of the invention.

As shown in FIG. 4, when weights 20 and 50 are aligned so that complimentary engagement regions 37 and 49 face each other, weights 20 and 50 can be stacked. Alternative embodiments include weights having female engagement regions such as 37 or male engagement regions 29, at both ends thereof, so that such a first weight could be stacked on to a second weight having the opposite engagement region at one end thereof.

FIG. 5 shows two weights 60 and 70 of different mass mated together in stacked relation. Beveled edges 80 and 81 can also be provided on weights 60 and 70.

The mass of the weight (100 g) can be molded or otherwise indicated on shell 22 of the weight, eliminating the need for a separate stamping operation, as in the prior art all metal weights. Shell 22 can also be color-coded to signify the mass of the weight. In addition, shell 22 can serve to increase the diameter of the weight, as shown in FIG. 3, so that it is larger than 1.25", the standard used to determine whether a small object poses a swallowing hazard to children.

A method for making such weights 20 comprises: cutting rod member 21 to a desired length; molding a shell 22 having a body 30, an interior region 25 and at least one end portion 28 to substantially cover at least a portion of the length of rod 21 and at least one end 26 of rod 21; inserting the rod member 21 into the interior region 25 of shell 22; forming a first engagement region 29 into end portion 24 of shell 22; and, configuring the first engagement region 29 of the shell so as to be capable of engaging a second engagement region such as 37 on another weight 50 to facilitate stacking of two weight members 20 and 50 in substantially end-to-end arrangement.

The foregoing description and drawings merely explain and illustrate the invention and the invention is not limited thereto except insofar as the appended claims are so limited, as those skilled in the art who have the disclosure before them will be able to make the modifications and variations therein without departing from the scope of the invention.

I claim:

1. A weight comprising:

a rod-shaped member having a length and first and second opposite ends; and a shell substantially encasing the rod-shaped member, the shell further comprising a first end portion operably positioned at one of the opposite ends of the rod-shaped member and a second end portion operably positioned at the remaining opposite end of the rod-shaped member, the first end portion having a male engagement region and the second end portion having a female engagement region, and the first and second end portions being shaped so as to enable mated, nested receipt of the engagement regions and, in turn, the stacking of two or more weights when placed in end-to-end arrangement.

2. The weight of claim 1 in which the shell completely encases the rod-shaped member.

3. The weight of claim 1 wherein the shell has at least one exterior substantially flat region along the length of the rod-shaped member to impede rolling of the weight.

4. The weight of claim 1 wherein the shell has a multiplicity of substantially flat regions along the length of the rod-shaped member to impede rolling of the weight.

5. The weight of claim 1 wherein the exterior surface of the shell is substantially hexagonal in transverse cross-section.

6. The weight of claim 1 wherein the engagement regions are substantially hexagonal in transverse cross-section.

7. The weight of claim 1 wherein the shell further comprises a portion of the end portion comprising a cap.

8. The weight of claim 1 wherein the shell is configured so that all outer edges of the shell along the length of the rod-shaped member are substantially rounded.

9. The weight of claim 1 wherein the rod-shaped member is substantially round in transverse cross-section.

10. The weight of claim 1 wherein the rod-shaped member is a steel rod.

11. The weight of claim 1 where the shell further comprises a weight designation to indicate the amount of the mass of the weight member.

12. The weight of claim 1 wherein the shell is color-coded to indicate the mass of the weight.

13. The weight of claim 1 wherein the weight has a transverse cross-sectional width greater than 1.25".

14. A weight comprising:

a rod-shaped member having a length and first and second opposite ends;

a shell having a body portion substantially encasing and extending along at least a portion of the exterior of the rod-shaped member along its length;

the shell further comprising at least one cap portion proximate one of the opposite ends of the rod-shaped member, the cap portion being capable of covering at least a portion of the end of the rod-shaped member;

the shell being configured so as to provide at least one substantially flat region along at least a portion of the body;

the rod-shaped member, the shell body and the cap portion being operably connected to each other so as to comprise a first weight member; and, the cap portion of the shell of the first weight member being capable of nesting with the cap portion of a second weight member to facilitate stacking of the weight members in an end-to-end fashion.

15. A plurality of weight members comprising:

a plurality of rod-shaped members, each of the rod-shaped members having a length and first and second opposite ends;

shells having a body portion substantially encasing and extending along at least a portion of the exterior of each of the rod-shaped members;

the shells further comprising at least one cap portion proximate one of the opposite ends of each of the rod-shaped members, the cap portions being capable of covering at least a portion of one end of each the rod-shaped members;

the shells configured so as to provide at least one substantially flattened region;

the rod-shaped members, shell bodies and cap portions being operably connected so as to comprise separate weight members; and the cap portion of the shell of at least one member being capable of being connected to the cap portion of at least one other weight member to facilitate stacking of the weight members in substantially end-to-end relation.

16. A method for making weights comprising:

cutting a rod material having opposite ends and a length to a desired length to form a rod-shaped member;

molding a shell having a body, an interior region and at least one end portion to substantially cover at least a portion of the length and at least one end of the rod-shaped member;

inserting the rod-shaped member into the interior region of the shell;

forming a first engagement region into the end portion of the shell; and configuring the first engagement region so as to be capable of engaging a second engagement region on another weight to facilitate stacking of two weight members in substantially end-to-end arrangement.

* * * * *